United States Patent [19]

Smith

[11] Patent Number: 4,872,205

[45] Date of Patent: Oct. 3, 1989

[54] RADIO COMMUNICATION SYSTEM HAVING AUTONOMOUSLY SELECTED TRANSMISSION FREQUENCIES

[75] Inventor: James W. Smith, Middletown, N.J.

[73] Assignees: American Telephone and Telegraph Company, New York, N.Y.; AT&T Information Systems Inc., Morristown, N.J. ; a part interest

[21] Appl. No.: 87,725

[22] Filed: Aug. 21, 1987

[51] Int. Cl.[4] .......................... H04B 1/00; H04B 7/00
[52] U.S. Cl. ....................................... 455/58; 455/34; 455/51; 455/56; 455/71; 340/825.50; 379/62
[58] Field of Search .................. 375/115; 455/33, 115, 455/34, 50–54, 56, 58, 71; 379/62, 63; 340/825.03, 825.04, 825.05, 825.50, 825.51

[56] References Cited

U.S. PATENT DOCUMENTS

| | | | |
|---|---|---|---|
| 4,023,103 | 5/1977 | Malm | 325/58 |
| 4,066,964 | 1/1978 | Costanza et al. | 325/55 |
| 4,222,115 | 9/1980 | Cooper et al. | 455/33 |
| 4,352,201 | 9/1982 | Miller | 455/58 |
| 4,419,765 | 12/1983 | Wycoff et al. | 455/161 |
| 4,446,564 | 5/1984 | Pierce | 455/58 |
| 4,479,226 | 10/1984 | Proubhu et al. | 455/33 |
| 4,506,384 | 3/1985 | Lucas | 455/58 |
| 4,554,668 | 11/1985 | Deman et al. | 375/1 |
| 4,644,347 | 2/1987 | Lucas et al. | 455/56 |

OTHER PUBLICATIONS

G. R. Cooper and R. W. Nettleton, "A Spread-Spectrum Technique for High-Capacity Mobile Communications", *IEEE Transactions on Vehicular Technology*, vol. VT-27, No. 4, Nov. 1978, pp. 264–275.

G. Einarsson, "Address Assignment for a Time-Frequency-Coded, Spread-Spectrum System", The Bell System Technical Journal, Sep. 1980, pp. 1241–1255.

*Primary Examiner*—Donald J. Yusko
*Assistant Examiner*—Tyrone Queen
*Attorney, Agent, or Firm*—John A. Caccuro

[57] ABSTRACT

When the disclosed frequency-hopping communication system is initially enabled, it detects another system operating within range by listening for a predefined radio frequency of a fixed duration. When that particular frequency is detected, the system knows that a master system is operating within range and is utilizing a first predetermined group of communication frequencies and, consequently, selects a second, third, etc. predetermined group of communication frequencies. If the particular radio frequency is not detected, the system becomes the master system, selects the first predetermined group of communication frequencies for intrasystem communication and begins transmitting the predefined radio frequency to indicate its master status.

12 Claims, 4 Drawing Sheets

RADIO COMMUNICATION SYSTEM HAVING AUTONOMOUSLY SELECTED TRANSMISSION FREQUENCIES

RELATED APPLICATION

Related subject matter is disclosed in the following application filed concurrently herewith and assigned to the same Assignee hereof: U.S. patent application 087726 entitled "Radio Communication System Using Synchronous Frequency Hopping Transmissions" now U.S. Pat. No. 4,850,036, inventor J. W. Smith.

TECHNICAL FIELD

This invention relates to a method of an apparatus for synchronizing the operation of two or more radio communication systems.

BACKGROUND OF THE INVENTION

In my co-pending, concurrently filed application entitled "Radio Communication System Using Synchronous Frequency Hopping Transmissions", there is described a method and apparatus for specifying frequencies and a frequency-hopping sequence for radio transceivers of a communication system. In certain applications, more than one such communication system may operate in a limited geographical area. Moreover, these systems may operate independent of each other and may even be separately owned. There exists a problem to prevent mutual radio frequency interference between systems operating in close proximity.

SUMMARY OF THE INVENTION

In accordance with the present invention, the disclosed radio communication system automatically detects when another radio system is within range and in response thereto selects a different group of frequency-hoppoing (FH) sequences. More particularly, when the system is initially enabled on power-up or other pre-established conditions, the control module (CM) of the system listens for a particular radio frequency control signal for a predetermined time period. If the CM detects the presence of the control signal, it is interpreted that another CM is operating within range and acting as a master system with zero or more slave CMs.

If the CM does not detect the control signal, it transmit the control signal and uses a first predetermined group of sequences for communications with stations of the system and becomes a master CM. If the CM detects a control signal, it automatically selects a second, third, etc. predetermined group of sequences for communication with stations of the system. In either event, the CM signals its stations as to which group of sequences is to be utilized for system communications.

In one embodiment, the control signal consists of two frequencies and also includes a clock sync message therein for synchronizing the operation of the systems.

DETAILED DESCRIPTION

In the following description, each item of each figure has a reference designation associated therewith, the first number of which refers to the figure in which that item is first located (e.g., 110 is located in FIG. 1).

Figure 1:
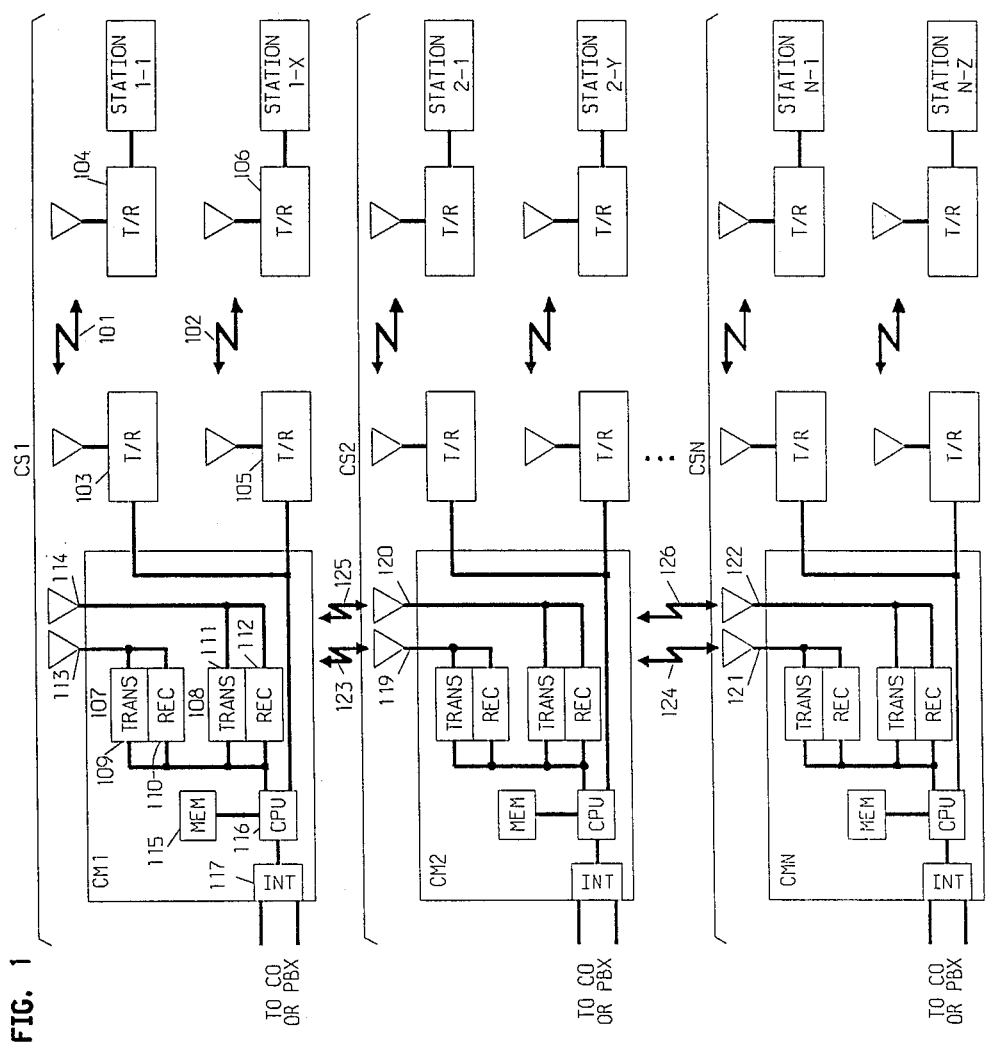
FIG. 1 shows an area having N communication systems within communication range of each other.

Shown in FIG. 1 is a multiple communication system (CS1-CSN) environment where CS1 - CSN operate within communication range of each other.

Each system (e.g., CS1) includes a control module (CM) connected by radio links (101-102) to a plurality of stations (1—1 through 1-X). Each end of the radio link includes transceivers (e.g., 103-106) including antenna for transmitting and receiving using frequency-hopping transmission. In my previously referenced co-pending patent application, I describe a frequency allocation and frequency-hopping synchronization technique useful for a radio frequency-hopping communication system.

Each system CS1-CSN also includes antennas 113,114 and transceivers 107 and 108 including, respectively, transmitters 109,111 and receivers 110 and 112. Antennas 113,114 and receivers 110,112 are used to receive a predetermined signal from corresponding circuits of systems CM2 - CMN. Similarly, antennas 113,114 and transmitters 109, 111 are used to transmit signals to corresponding circuits of systems CM2 - CMN. The transceivers 103 - 108 may all be of a similar type, each arranged to receive and transmit at the appropriate frequencies. The system CS1 operates under control of CPU 116 using programs stored in memory 115. CPU 116 establishes and controls all communications functions between CM1 and the stations of system CS1. The interface circuit 117 interfaces the system CS1 to the central office (CO) or other private branch exchanges (PBX).

While the communications systems CS1 - CSN may be any of a variety of system types, illustratively they are described herein as key telephone type systems. Moreover, systems CS1 - CSN need not all be of the same type physically or operationally so long as the systems use the same mode of frequency group allocation and system synchronization.

Because radio propagation from each system may extend well beyond the boundaries of each system, a method was needed to minimize interference between multiple systems operating in close proximity. In accordance with the present invention, this is accomplished by using the system start-up procedure shown in FIG. 2. The present invention shown in FIG. 2 may be implemented as part of the programs stored in memory (e.g., 115) and utilized by CPU (e.g., 116) to control the operations of system CS1.

Figure 2:
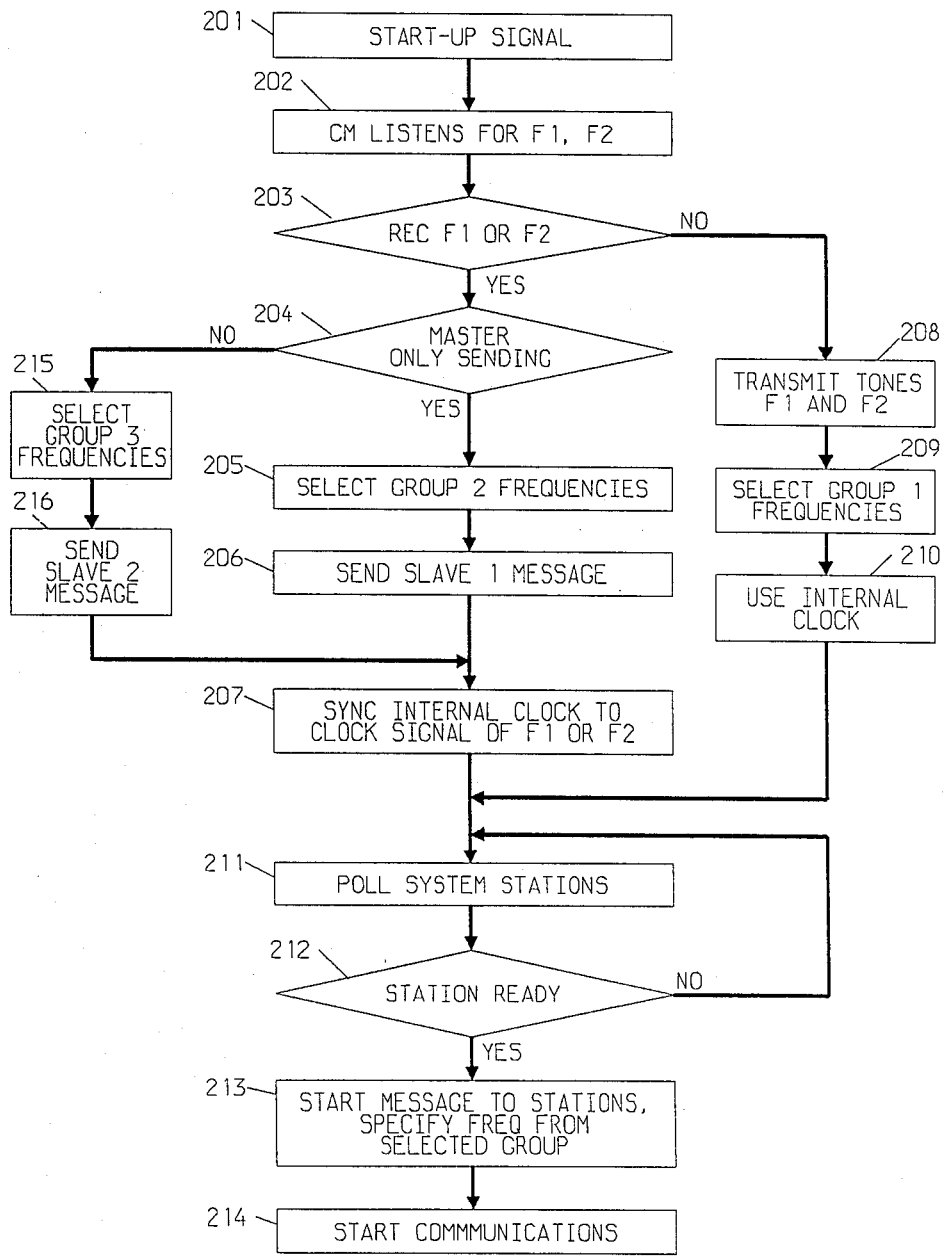
FIG. 2 shows the automatic start-up sequence for allocating frequency groups to each system.

With reference to FIG. 2, an illustrative start-up sequence is described for control module CM1 of system CS1 assuming N =3 (3 control modules). In step 201, the start-up sequence is enabled at CS1 in response to a start-up signal generated when CS1 is either initially powered-up, recovering from a loss of synchronization, recovering from a loss of signal, or other predefined system conditions. In step 202, CM1 listens for predetermined frequencies F1 and F2 using receivers 110,112. Two frequencies, F1 and F2, are used so that if multipath fading affects one frequency, the other one will be received.

Figure 4:
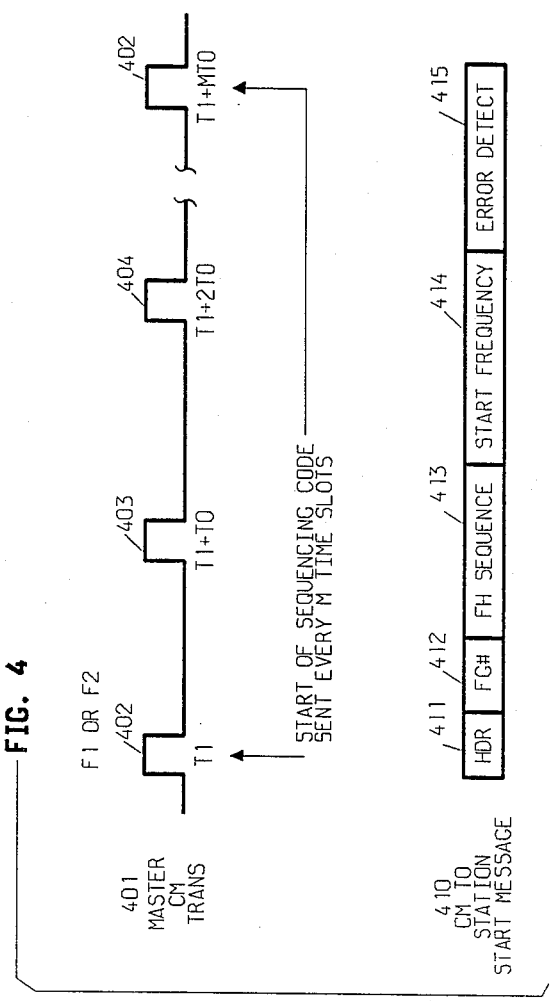
FIG. 4 shows illustrative signals and contents of messages.

In FIG. 4, there is shown one illustrative example, 401, of a master CM transmission of F1 or F2. The transmission from CM acting as a master takes the form of a 10-ms Pulse every 1 second (TO=1 sec). Every M seconds (e.g., 30 sec), a special message or code identifies the start of sequencing at the master CM. The start of sequencing code 402 indicates the time when the master CM and its associated stations start the FH sequence from the starting frequency. Knowing this information, a slave CM which desires to use the same frequencies as the master CM can do so as long as those frequencies are utilized during a different time interval.

Assume, for example, that a master CM has a maximum of 64 two-way radio links to its 64 stations. It therefore requires 128 starting frequencies (e.g., FO - F127), since two frequencies are required per link. Assume also that there are a total of 128 radio links using 256 hopping frequencies available (i.e., FO to F255). Then a slave CM likewise having up to 64 radio links could share the 256 frequencies with no frequency overlap if it used starting frequencies F128 to F256. Since master CM system started with FO - F127 and slave CM system started with F128 - F255 and since both systems frequency hop in sync, then when master CM system has frequency hopped to F128 - F255 the slave CM system will have hopped to FO - F127. Consequently, there is no current use of the same frequencies FO - F255 by both the master CM and slave CM. Such an arrangement, however, would require that the slave CM know the maximum size and starting frequencies of the master CM.

Figure 3:
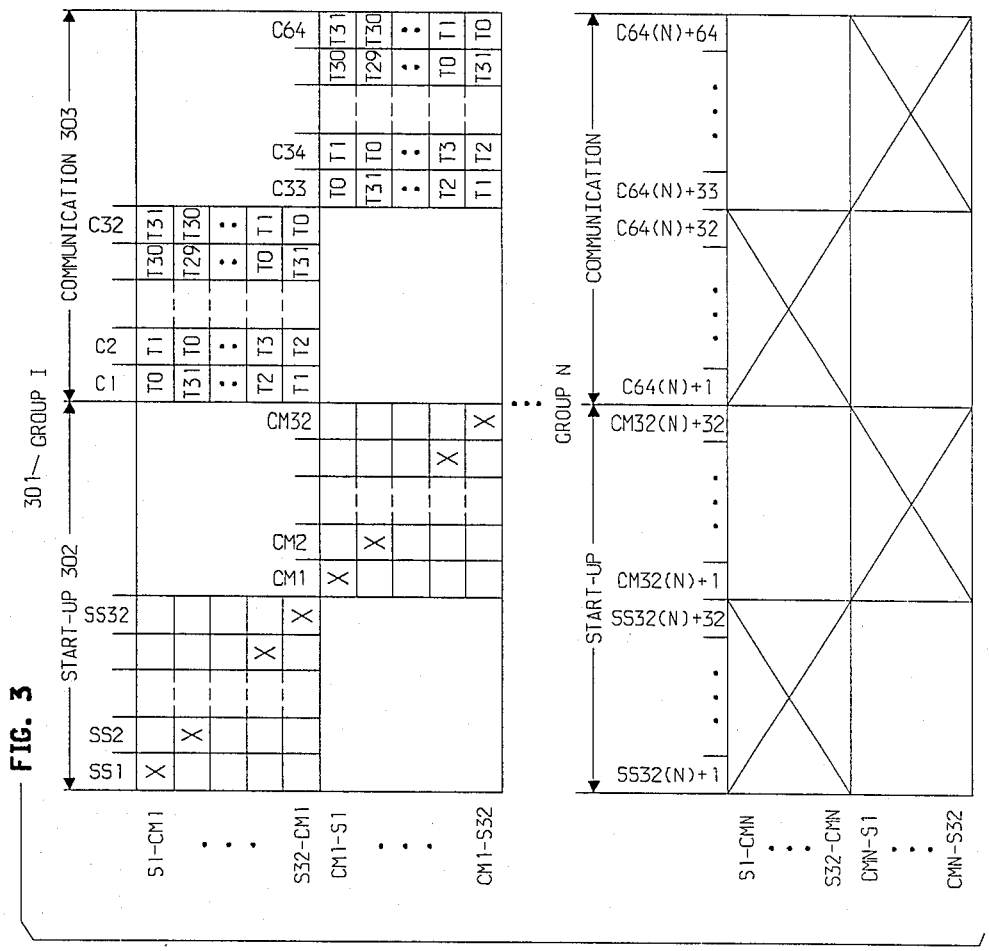
FIG. 3 shows one illustrative frequency group allocating for each communication system.

Returning to FIG. 2, assuming that the frequency F1 and/or F2 is detected in step 203, then CM1 becomes a slave CM and will select group 2, step 209 or group 3, step 215 frequencies (hopping sequences) for its radio links to its stations. Note the group 1 frequencies are used by the master CM. Shown in FIG. 3 is an illustrative example of groups of frequencies which can be utilized by the master CM system and slave CM systems. FIG. 3 will be discussed in a later paragraph.

In accordance with another aspect of the present invention, once CM1 determines it is a slave CM system, it transmits F1 and F2 from, respectively, transmitters 109, 111 at times interleaved (not shown) with the pulses shown by 401 of FIG. 4. Another system (e.g., CMN) within close proximity to both the master CM (assume CM2) and slave CM1 would detect that F1 and F2 are being received at a rate which indicates that two CMs are operating within its range (the no output of step 204). Thus, CMN would know it is the second slave system and selects, 215 the next available frequency group (e.g., group 3) for radio transmission within its system. CMN then ououts a slave message in step 216. Hence, in our example, the master system CM2 uses group 1 frequencies; the first slave CM1, group 2 frequencies; and second slave CMN, group 3 frequencies. Alternatively, the first slave, CM1 in our example, could transmit using a wider pulse width W (see 401 of FIG. 4), different pulse repetition rate (not shown), different modulation type (not shown), or different frequency (not shown) to signal its existence to subsequent systems which are starting up.

Returning to FIG. 2, the presence of a slave unit already operating is detected in step 204. Assuming there is no other slave 205, the group 2 frequencies are selected and CM1 transmitter 109 sends a message, 206, that slave 1 is operating. Since CM1 is a slave CM, in step 207 it synchronizes its interval clock to that of the master CM using the start of sequencing code 402 of FIG. 4.

In step 203 of FIG. 2, if neither frequency F1 nor F2 is received by receivers 110, 112 after a random monitoring period of several seconds, then CM1 assumes it is the master CM and in step 208 transmits a frequency F1 and F2 using transmitters 109 and 111. A random monitoring time interval averaging about 20 seconds is selected to reduce the probability of two former slave CM systems from becoming the master system simultaneously, when the former master CM is removed from service. Assuming that the CM1 system became the master system, then in step 209 CM1 selects group 1 frequencies (301 of FIG. 3) for use as radio links between CM1 and stations 1—1 through 1-X of FIG. 1. Thereafter, in step 210 CM1 uses its interval clock to send the synchronizing signal shown in 401 of FIG. 4. Note, according to another aspect of the present invention, the frequency group number and starting frequency used by the master system can be included as part of start sequencing code 402.

Following step 207 or 210, CM1 in step 211 polls stations 1—1 through 1-X. If no response is received, CM1 continues polling until the station answers or CM1 determines the station is not operational (e.g., by timing out).

After a station responds (step 212), a start message is sent in step 213. The start message of step 213 is shown illustratively as 410 of FIG. 4. The start message includes a header 411 to sync the station to CM1, the frequency group number 412, the FH sequence 413 to be used by that station, a starting frequency 414 and an error code 415 for detecting error in the start message. Obviously, the selection of a start frequency 414 for each station may be used to designate predefined FH sequences 413 and frequency group identification 412 for each station. Moreover, predefined FH sequences 413 and a unique start frequency 414 for each station may also be selected using frequency group code 412. Other variations are also contemplated.

The start message 213 is transmitted to each station of the system using an assigned start-up frequency from the appropriate frequency group. Shown in FIG. 3 are groups of frequencies (group 1 through group N) which may be used by an illustrative system having both a group of start-up frequencies 302 and a group of communication frequencies 303. Assuming system CM1 is the master station and selects group 1 frequencies, the start-up frequency for station S1 to CM1 transmission is SS1, while the start-up frequency of transceiver 103 of CM1 to station S1 transmission is CM1. Similarly, for stations S2 through S32 (assuming 32 stations), it transmits using frequencies SS2 - SS32 and receives using frequencies CM2 - CM32.

After the completed reception of the start message 213, all stations SS1 - SS32 and CM1 would start frequency-hopping transmission at the assigned frequency. Thus, with reference to FIG. 3, station S1 in time slot TO starts transmitting at frequency C1, station C2 at frequency C2, and station S32 at frequency C32. Similarly, at time slot TO, transceiver 103 at CM1 associated with station S1 transmits at frequency C33 and so forth, with the CM1 to station S32 transmission occurring at frequency C64. In synchronism, all transceivers at all stations and at CM1 switch to a new time slot T1, resulting in transmission at the frequencies listed at T1 in group 1 of FIG. 3. Thus, station S1 transmits at frequency C2, S2 at C3, etc. Similarly, at time slot T1, the CM1 transmits to station S1 at frequency C34, etc. Such a frequency-hopping arrangement is more fully described in my co-pending application, previously cited and incorporated by reference herein.

What has been described in merely illustrative of the application of the principles of the present invention. Other methods and circuits can be implemented by those skilled in the art without departing from the spirit and scope of the present invention.

What is claimed is:

1. A control module for use in a first radio communication system for communicating with each of a plurality of stations and for detecting a presence and absence of radio frequency signals, said control module comprising
    first receiver means for receiving a predetermined first radio frequency signal from a source other than said plurality of stations,
    second means for receiving a start-up signal, and
    first transmitter means jointly responsive to said start-up signal and the absence of reception of said first radio frequency signal in a predefined time interval for transmitting said first radio frequency signal.

2. The control module of claim 1 wherein said first radio frequency signal is received from a second communication system indicating the radio frequencies used for communications within said second system.

3. The control module of claim 2 wherein said first radio frequency signal includes a start sequence signal and wherein said first-system synchronizes its operation to said second system using said start sequence signal.

4. The control module of claim 1 wherein said start-up signal is generated when said control module is initially powered.

5. The control module of claim 1 wherein said start-up signal is generated when the first receiver means indicates the absence of said first radio frequency signal.

6. The control module of claim 1 wherein said predefined interval is a random time interval following the power-up of said control module.

7. The control module of claim 1 wherein said transmitter means transmits said first radio frequency signal at a predetermined periodic rate for a time greater than said predefined interval.

8. The control module of claim 1 wherein said first receiver means receives a second radio frequency signal and
said first transmitter means additionally transmits said second radio frequency signal in response to the absence of reception of both said first radio frequency signal and said second radio frequency signal.

9. The control module of claim 1 wherein said first transmitter means is also responsive to the presence of reception of a pulsed first radio frequency signal in a predefined time interval for transmitting a second radio frequency signal, said second radio frequency signal is a pulsed signal having the same frequency as said first radio frequency signal, and is interleaved in time therewith.

10. The control module of claim 1 further comprising
    second transmitter means for transmitting radio frequency signals,
    means for selecting a first group of radio frequencies for transmission from said second transmitter means to said plurality of stations in response to the absence of reception of said first radio frequency signal and for selecting a second group of radio frequencies for transmission from said second transmitter means for transmitting to said plurality of stations in response to the reception of said first radio frequency signal.

11. A radio communication system comprising a control module for transmitting to each of a plurality of stations and for detecting the presence and absence of radio frequency signals, said system further comprising
    at said control module
    first receiver means for receiving a predetermined first radio frequency signal from a source other than said plurality of stations,
    second means for receiving a start-up signal, and
    means jointly responsive to said start-up signal and the absence of reception of said first radio frequency signal in a predefined time interval for transmitting said first radio frequency signal and for communicating with said plurality of stations using a first group of frequencies.

12. The radio communication system of claim 11 wherein said means for transmitting communicates with said plurality of stations using a second group of frequencies in response to said start-up signal and the absence of said first radio frequency signal.

* * * * *